(12) United States Patent
Primlani (10) Patent No.: US 7,654,073 B2
(45) Date of Patent: Feb. 2, 2010

(54) POWER GENERATING SYSTEMS AND METHODS

(76) Inventor: Indru J. Primlani, P.O. Box 3022, Renton, WA (US) 98056

(*) Notice: Subject to any disclaimer, the term of this patent is extended or adjusted under 35 U.S.C. 154(b) by 156 days.

(21) Appl. No.: 11/805,248

(22) Filed: May 21, 2007

(65) Prior Publication Data

US 2008/0196410 A1 Aug. 21, 2008

Related U.S. Application Data

(60) Continuation-in-part of application No. 11/534,876, filed on Sep. 25, 2006, now abandoned, which is a division of application No. 11/105,130, filed on Apr. 12, 2005, now Pat. No. 7,134,285, which is a continuation-in-part of application No. 10/733,898, filed on Dec. 11, 2003, now Pat. No. 6,955,052.

(51) Int. Cl.
F02C 6/00 (2006.01)
F02C 1/00 (2006.01)
F02C 3/30 (2006.01)

(52) U.S. Cl. .................. 60/39.183; 60/641.15; 60/772; 60/774; 60/775; 244/30; 244/53 R (58) Field of Classification Search ............... 60/641.8, 60/641.11, 641.13, 641.14, 641.15, 39.12, 60/39.53, 39.54, 39.55, 39.56, 39.57, 39.58, 60/39.59, 39.181, 39.182, 39.183, 39.19, 60/620, 281, 689, 772, 775; 126/561–713; 123/46 A See application file for complete search history.

(56) References Cited

U.S. PATENT DOCUMENTS

| 3,358,656 A | | 12/1967 | Panhard |
| 3,596,034 A | * | 7/1971 | Mekjean ..................... 219/628 |
| 3,775,973 A | | 12/1973 | Hudson |
| 4,024,703 A | | 5/1977 | Hudson |
| 4,055,948 A | * | 11/1977 | Kraus et al. ................. 60/641.8 |

(Continued)

OTHER PUBLICATIONS

"1963 Chrysler Turbine Car Technical Information," retrieved on Mar. 28, 2005 from http://www.turbinecar.com/turbook/content.htm, 6 pages.

(Continued)

*Primary Examiner*—Thomas E Denion
*Assistant Examiner*—Christopher Jetton
(74) *Attorney, Agent, or Firm*—Seed IP Law Group PLLC (57) ABSTRACT

A power-generating system is provided for operating adiabatically and reducing emissions of greenhouse gases contributing to global warming. The system may include gas reactors and/or combustors that burn a fuel and an oxygen-containing gas under substantially adiabatic conditions such that high-pressure combustion products and low pressure combustor housing cooling air are combined to produce a medium pressure working fluid. Higher thermal efficiencies reduce emissions of greenhouse gases. Products of combustion can be processed to further reduce emissions of carbon dioxide and other greenhouse gases from portable and stationary exhaust-producing devices using different fuels. The system may also include solar collectors that pick up a spectrum of solar energy by means of cells containing fluids, aligned to concentrate the solar rays. The collectors may pick up direct and/or diffused solar radiation and can be used to power self-propelled vehicles or function as a roof of a building.

39 Claims, 8 Drawing Sheets

U.S. PATENT DOCUMENTS

| | | | |
|---|---|---|---|
| 4,184,480 A * | 1/1980 | Kenny | 126/704 |
| 4,204,703 A | 5/1980 | Okada | |
| 4,205,638 A | 6/1980 | Vlacancinch | |
| 4,237,868 A * | 12/1980 | Overton | 126/624 |
| 4,249,516 A * | 2/1981 | Stark | 126/601 |
| 4,399,654 A * | 8/1983 | David | 60/595 |
| 4,452,047 A * | 6/1984 | Hunt et al. | 60/641.15 |
| 4,454,865 A * | 6/1984 | Tammen | 126/640 |
| 4,534,525 A * | 8/1985 | Bliamptis | 244/30 |
| 4,693,075 A | 9/1987 | Sabatiuk | |
| 5,180,284 A * | 1/1993 | Monrose et al. | 416/204 R |
| 5,237,811 A | 8/1993 | Stockwell | |
| 5,417,052 A * | 5/1995 | Bharathan et al. | 60/783 |
| 5,474,235 A * | 12/1995 | Cole et al. | 239/431 |
| 5,771,682 A | 6/1998 | Simons | |
| 5,810,284 A * | 9/1998 | Hibbs et al. | 244/13 |
| 5,832,885 A * | 11/1998 | Moyer | 123/90.16 |
| 5,960,625 A | 10/1999 | Zdvorak, Sr. | |
| 6,000,211 A * | 12/1999 | Bellac et al. | 60/775 |
| 6,062,029 A * | 5/2000 | Doe | 60/641.15 |
| 6,203,587 B1 | 3/2001 | Lesieur et al. | |
| 6,527,828 B2 | 3/2003 | Flippo et al. | |
| 6,532,743 B1 | 3/2003 | Fischer | |
| 6,545,191 B1 | 4/2003 | Stauffer | |
| 6,955,052 B2 | 10/2005 | Primlani | |
| 7,007,474 B1 * | 3/2006 | Ochs et al. | 60/653 |
| 7,296,410 B2 * | 11/2007 | Litwin | 60/641.12 |

OTHER PUBLICATIONS

"Gas Turbine Vehicles by Chrysler Corporation, Mar. 1954-Jul. 1962," Chrysler Corporation Engineering Division, Technical Information Section, Jul. 16, 1962, 18 pages.

"America's First Turbine Car," Conklin Systems, retrieved Mar. 26, 2005 from http://www.conklinsystems.com/firebird/mlife.shtml, 15 pages.

"Winged Warriors/National B-Body Owners Association 1963 Chrysler Turbine Car," retrieved Mar. 21, 2005 from http://wwnboa.org/ctc.htm, 2 pages.

* cited by examiner

POWER GENERATING SYSTEMS AND METHODS

CROSS-REFERENCE TO RELATED APPLICATION

This application is a continuation-in-part of U.S. patent application Ser. No. 11/534,876, filed Sep. 25, 2006, now pending, which application is a divisional of U.S. patent application Ser. No. 11/105,130, which application issued as U.S. Pat. No. 7,134,285 and is a continuation-in-part of U.S. patent application Ser. No. 10/733,898, which application issued as U.S. Pat. No. 6,955,052, where these (three) documents are incorporated herein by reference in their entirety.

BACKGROUND

1. Technical Field

The present invention generally relates to power generating systems, and more particularly, to systems and methods for generating power adiabatically and via solar energy.

2. Description of the Related Art

For over the past 200 years, the burning of fossil fuels, such as coal and oil, and deforestation have caused the concentrations of heat-trapping "greenhouse gases" to increase significantly in our atmosphere. These gases prevent heat from escaping to space, somewhat like the glass panels of a greenhouse. Carbon Dioxide is one of the most significant green house gases.

Greenhouse gases are necessary to life as we know it because they keep the planet's surface warmer than it otherwise would be. However, as the concentrations of these gases continue to increase in the atmosphere, the Earth's temperature is climbing above past levels. Earth's average surface temperature has increased by about 1.2 to 1.4 degrees Fahrenheit since the year 1900. The warmest global average temperatures on record have all occurred within the past 15 years, with the warmest two years being 1998 and 2005. Most of the warming in recent decades is likely the result of human activities. Other aspects of the climate are also changing such as rainfall patterns, snow and ice cover, and sea level.

If greenhouse gases continue to increase, climate models predict that the average temperature at the Earth's surface could increase from 2.5 to 10.4 degrees Fahrenheit above 1990 levels by the end of this century or sooner. Scientists are certain that human activities are changing the composition of the atmosphere, and that increasing the concentration of greenhouse gases will adversely change the planet's climate. However, they are not sure by how much it will change, at what rate it will change, or what the exact effects will be. Energy-related activities account for about three-quarters of our human-generated carbon dioxide and other greenhouse gas emissions from burning fossil fuels. More than half the energy-related emissions come from large stationary sources such as power plants, while about a third comes from transportation. Industrial processes (such as the production of cement, steel, and aluminum), agriculture, forestry, other land use, and waste management are also important sources of greenhouse gas emissions.

State of the art engines and thermal power generating plants generally have poor thermal efficiencies, for example, in the range of 30 to 40%. This is due to heat lost by system cooling, friction of moving parts and energy lost in exhaust gases. In order to meet atmospheric emission standards additional energy is used to condition exhaust gases for reducing the toxicity. Such inefficiencies typically produce large amounts of carbon dioxide that are spewed into the atmosphere.

Some of the consequences of global warming include direct manifestations of a widespread and long-term trend toward warmer global temperatures, heat waves and periods of unusually warm weather, ocean warming, sea-level rise and coastal flooding, glaciers melting, arctic and Antarctic warming, spreading disease, earlier spring arrival, plant and animal range shifts and population changes, coral reef bleaching, downpours, heavy snowfalls, flooding, droughts, and fires.

Accordingly, there is a need for systems and methods for adiabatic power generation and greenhouse gas reduction.

BRIEF SUMMARY

According to one embodiment, an adiabatic power generating system configured to promote reduction in production of greenhouse gases for slowing global warming, comprises means for forming a primary fluid at a first range of elevated temperature and pressure, means for forming a secondary fluid at a second range of temperature and pressure, less than the first range, and a substantially thermally insulated mixing and expansion device in fluid communication with the means for forming the primary and secondary fluids, the thermally insulated mixing and expansion device being configured to expand the primary or secondary fluid and to mix the primary and secondary fluids to form an admixture of fluids as a working fluid having a third range of temperature and pressure, between the first and second ranges.

According to another embodiment, a solar-powered system for preparing a working fluid for use with a work producing device or for preparing a primary or secondary fluid for making the working fluid, comprises a solar ray collector having a plurality of cells configured to follow a position of a solar source to concentrate solar rays into high-energy beams, a receiver tank, a heat exchange band in fluid communication with the cells for forming the secondary fluid, the heat exchange band being in fluid communication with the receiver tank for storing or delivering the secondary fluid for use as the working fluid or for making the working fluid, and at least one pressure tank having a heat exchange element and being in fluid communication with the heat exchange band for forming and delivering the primary fluid for use as the working fluid or for making the working fluid.

According to yet another embodiment, a method of minimizing emission of greenhouse gases from an exhaust fluid of a power-generating system and slowing global warming, comprises reacting at least a portion of the exhaust fluid including carbon dioxide and sulfur dioxide with an alkaline reagent to produce a solid particulate, and separating and disposing of the solid particulate, thereby reducing the emissions of greenhouse gases including carbon dioxide from the exhaust fluid.

According to still another embodiment, a system for minimizing greenhouse gases from an exhaust fluid of a power-producing system and slowing global warming, comprises a reaction chamber configured to receive at least a portion of the exhaust fluid, and a mixing device configured to mix a liquid and an alkaline reagent to form an atomized solution, the mixing device being in fluid communication with the reaction chamber to supply the atomized solution thereto, the reaction chamber reacting the exhaust fluid and the atomized solution for reducing greenhouse gases including carbon dioxide.

DETAILED DESCRIPTION

Figure 1:
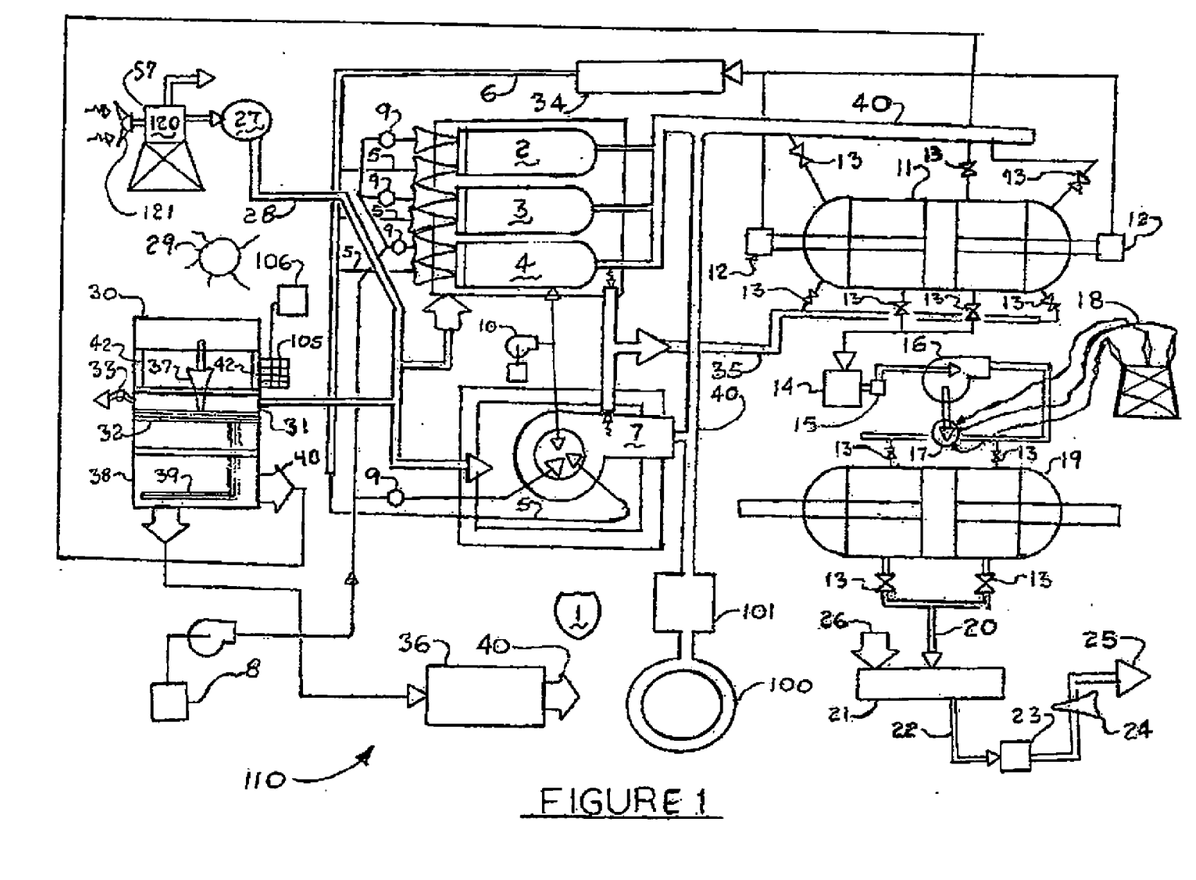
FIG. 1 is a schematic diagram of a power-generating system according to one embodiment.

FIG. 1 illustrates a power-generating system 110 operable to provide a hybrid renewable energy/thermal power system controlled by a computer 1 to operate in a programmed sequence for optimum performance. The power-generating system 110 also comprises at least one power reactor, for example three power reactors 2, 3 and 4 mounted on a common frame and sized in proportion to a designed load. In one embodiment, one cubic foot volume of the reactors 2, 3, or 4 can yield approximately 75 Horse Power. Compressed air 5 in combustion air manifold 6 at a pressure in the range of 25 to 500 PSIA, preferably from about 100 to 150 PSIA, is charged into each of the reactors 2, 3 and 4. In one embodiment, the reactors 2, 3 and 4 are charged with an amount of compressed air 5 in excess of the stoichiometric requirements for combustion of a fuel. The power-generating system 110 can also comprise a combustor 7 in fluid communication with the reactors 2, 3 and 4. After charging the reactors 2, 3 and 4 and combustor 7 with compressed air 5, a combustible fuel, for example compressed natural gas or pressurized and atomized ethanol, is charged into the reactors 2, 3 and 4 and combustor 7 from a fuel supply system 8 having a fuel storage space, controls and conditioning for combustion with a plurality of fuel injectors 9, respectively in fluid communication with the reactors 2, 3 and 4, and the combustor 7. Preferably, water is also charged into the reactors 2, 3 and 4 and combustor 7 via a water injection system 10.

After a combustible mixture of fuel and compressed air has been charged into the reactors 2, 3 and 4 and/or combustor 7, the combustible mixture is ignited to start a burning process and produce a primary fluid 40. The primary fluid 40 may include primary gases that are gaseous combustion products at an elevated temperature ranging from about 2100° F. to about 3000° F., and at an elevated pressure ranging from about 800 PSIA to about 3000 PSIA, which exit the reactors 2, 3 and 4 and combustor 7 as the primary fluid 40 and are fed into a mixing and expanding device, such as a double-acting free piston mixer/expander 11 that is mechanically coupled to an air compressors 12. A plurality of automatic control valves 13 regulate gas flow into the mixer/expander 11. The mixer/expander 11 is used to mix the primary fluid and a secondary fluid having a temperature and pressure range less than the first range, with limited expansion to provide just enough work to develop combustion air requirements by operating air compressors 12. The air compressors 12 output can be charged into a buffer tank 34, while an effluent from the mixer/expander 11 is directed to a working fluid storage tank 14 in fluid communication with a power turbine 16.

The power-generating system 110 further comprises regulating controls 15 that provide modulated flows to the power turbine 16, which in turn is coupled to an electrical generator 17. The electrical generator 17 is electrically coupled to an electrical grid 18. The effluent from the power turbine 16 is directed to a double acting free piston 19 wherein the gas expands to sub-atmospheric pressures and is sub-cooled for yielding a low pressure cold fluid 20. The low pressure cold fluid 20 is fed to a heat exchanger 21 in which atmospheric air 26 is fed to produce cooled air at ambient pressure. Fluids exit the heat exchanger 21 and are fed through a line 22 to a cooling device 23, such as an air-conditioning unit. An exhaust effluent from the cooling device 23 is treated with an alkaline chemical 24 such as sodium hydroxide spray to convert a portion of the carbon dioxide to a sodium carbonate powder that can be removed by a dust separating device yielding a final exhaust effluent 25. Accordingly, a concentration of carbon dioxide emitted to a surrounding environment is minimized.

In one embodiment, the power-generating system 110 may further comprise a wind power system 57. The wind power system 57 can be coupled to a compressor 120, such as an unloading type compressor. The wind power system 57 includes at least two wind turbine blades 121 that can be feathered, while unloading the air compressor, to operate at minimum wind velocity cut-in speeds. The wind power system 57 can be automatically controlled to optimize the conversion of wind energy available to a pressurized compressed air. For example, where the compressor 121 has a plurality of cylinders, a number of operating cylinders may vary depending on available wind energy at any given time. The compressed air is stored in a tank 27 and fed into a housing of the combustor 7 and/or a housing of the reactors 2, 3, and 4 via a cooling air manifold 28.

In one embodiment, a solar or radiation source, such as the sun 29, travels across the horizon while solar energy is incident on a solar collector 30 wherein the sun rays are concentrated to high-energy beams 37 through a plurality of cells in collector 30. A heat exchanger band 32, inside a solar receiver tank 31, continuously picks up the high-energy solar beam 37 by automatically pumping cell fluids to the cells positioned to follow a movement of the sun 29. All cells are not filled with fluid to reduce structural loads and reduce costs. The heat exchanger 32 can be in thermal communication with a heat transfer element 39 at least partially positioned inside a pressure tank 38. A pressure of the fluid rises considerably in the tank 38 and is used to provide or add to the primary fluid 40 that is fed into the mixer/expander 11 discussed above.

The primary fluid 40 contains an elevated level of potential energy and can also be used directly for useful work in suitable work producing expansion devices. The primary fluid 40, which can be produced from one of a plurality of tanks 38 can be transferred to at least one, or a group of underground-insulated storage tanks 36 that contain miscellaneous materials in liquid or solid state to increase thermal mass. When adequate storage is provided in solar sites, it is possible to produce power continuously without the use of any fossil fuels. During the standalone solar operating mode, the compressed air produced by the wind power system 57 can be used as a part of the working fluid.

The collector 30 may also include a photovoltaic array 105 which can be cooled via the cooled air exiting the heat exchanger 21 through line 22. The photovoltaic array 105 can be in electrical communication with an electrical power system 106 to provide electrical power thereto, the electrical power system 106 being in electrical communication with the grid 18.

The low pressure compressed air in the manifold 28 produced by the wind power system 57 and/or a low pressure compressed air 33 produced from the solar receiver tank 31 can constitute a cooling fluid that is fed to an air cooled heat exchanger, or a plurality of air cooled heat exchangers of a housing of the reactors 2, 3 and 4 and/or a housing of the combustion device 7 to extract waste heat from the combustion processes discussed above. The resulting fluid can be fed, as the secondary fluid, through manifold 35, to the mixer/expander 11. One of skill in the art will appreciate that actual heat exchangers are not required and a volume of the respective housings between the combustion device 7 or reactors 2, 3 and 4, and the respective housings allows for the cooling fluid to surround these devices for being in a heat exchange relationship therewith.

In one embodiment as illustrated in FIG. 1, the power-generating system 110 may comprise a network of at least one, or a plurality of, storage devices in fluid communication with a network of distributing channels, forming an energy internet 100. The primary fluid 40 at very high pressure can be supplied in relatively small pipes to loads as described above. The power-generating system 110 may further comprise tank 101 for storing high-pressure gases. The tanks 101 can comprise large structures such as large spherical structures designed for American Society of Mechanical Engineers (ASME) pressure vessels. Gas pressures can be stepped down and used for all energy requirements for a building including electrical power generation. The high-pressure gas loop is energy efficient resulting in significant reduction in global warming gases emissions to the atmosphere. Furthermore, the power-generating system 110 is suitable for hybridization with other forms of renewable energy such as geothermal power and power from ocean tides.

One of ordinary skill in the art will appreciate that such an embodiment can be used for producing electrical power for buildings. Electrical technology has established that an efficient and economical way to transport large amounts of energy is to use very high voltages and low current flow in relatively smaller wires. Hence, typically large wire-supporting structures are laced with high-tension transmission lines. A similar concept is used for a complex of buildings, such as large university campuses. The campus is serviced with an underground "primary loop" of high voltage wires fed from one or more sources. Each large building taps into the primary loop with a local substation at the site of the building. The electrical loads in the building are usually served with 11,000 volts or higher primary voltage with transformers to step down to 480 volts for large loads and electrical motors. Additional transformers can be used to step down to 277 or 120 volts for lighting and the smaller every day uses of electrical appliances. Power losses may occur in the delivery and use of electricity, resulting in about 35% efficiency.

The following description provides a background for another embodiment of the present invention in which solar rays concentration systems can be used to heat a heat exchanger medium to approximately 3000 degrees Fahrenheit. A solar heat transfer medium can be circulated into pressure tanks to develop a high pressure and temperature primary fluid. Fuel powered reactors, such as those described above, can be installed at the site or remotely. Solar energy can be collected continuously while a fuel as required can supplement reactor energy requirements. For improved efficiency, air is locally compressed with water injection for cooling to approximate isothermal compression. Further, air-cooling can be accomplished with evaporative cooling. Higher initial reactor charging air pressure can yield a higher final system pressure. Output for power generation can be continuous or be operated part-time. Fuel is used based on priority of demands. Temperatures in the reactors is maintained in a range from 2,000 to 3,000 degrees Fahrenheit and the pressure of the reactor gases can reach 1,000 pounds per square inch and higher. Power is generated continuously and a quantity of fuel used is reduced based on an availability of solar energy. Location of plants is expected in areas with high average annual insolation rates. Typically, in a 24-hour cycle, a radiation angle of the sun changes 15 degrees per hour. Based on an adiabatic process surfaces with elevated temperatures are insulated to minimize heat losses.

Figure 2:
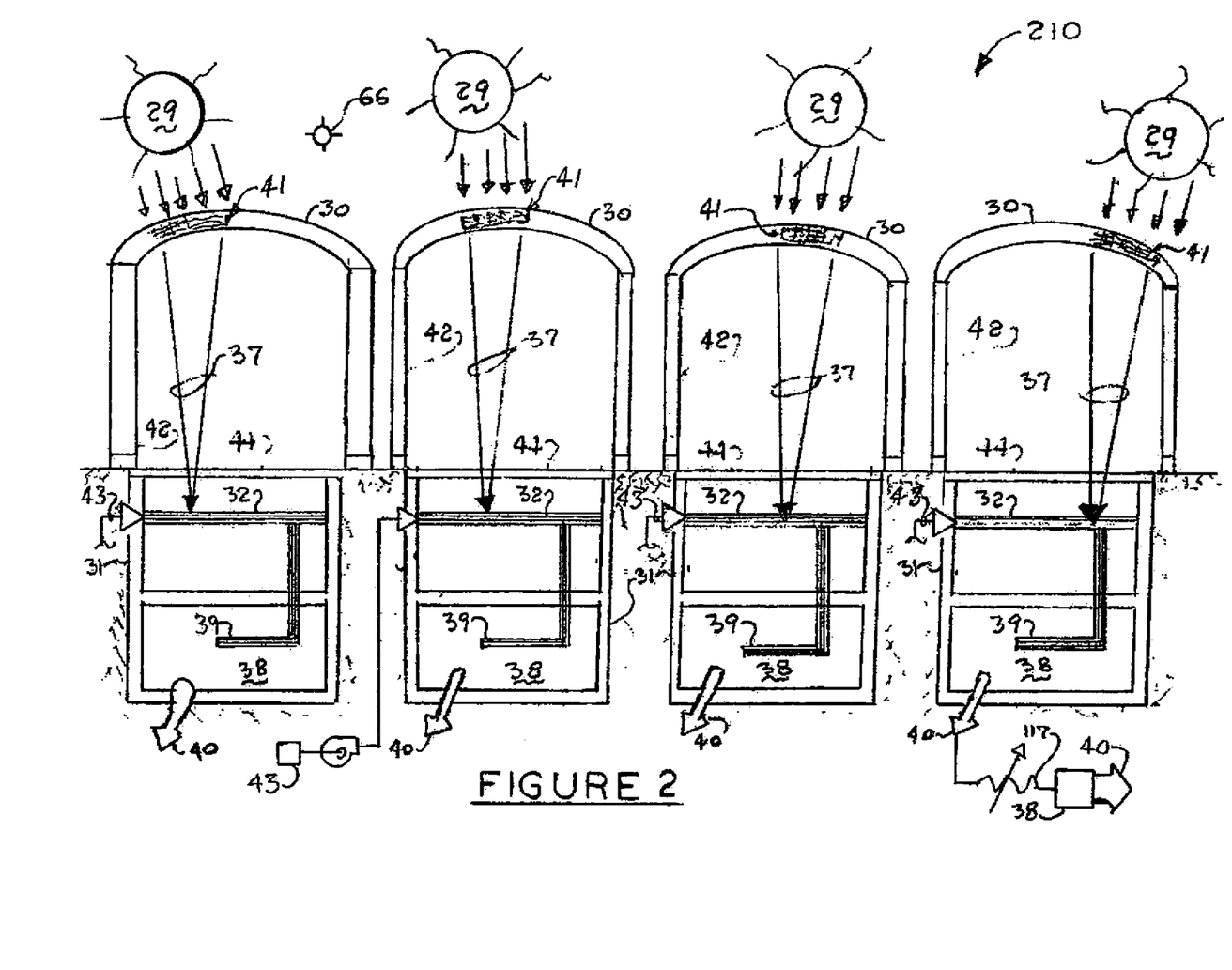
FIG. 2 is a schematic diagram of a portion of a power-generating system according to another embodiment.

FIG. 2 illustrates a solar-powered system 210 according to one embodiment, which can be used in conjunction with the power-generating system 110 discussed above. The solar-powered system 210 comprises a sensor 66 to monitor a movement or positioning of the sun 29, indicated as making a solar arc at about fifteen degrees per hour across a horizon with focus points of the concentrated solar beams 37 moving across the heat transfer band 32, wherein a heat transfer fluid system 43, such as liquid sodium, picks up the solar heat gain and transfers it to a pressure tank 38 via the heat transfer element 39. Thermal compression is performed in constant volume tank 38 by raising a temperature of the fluid. This pressurized fluid effluent, which can act as the primary fluid 40, may be cooled to ambient temperature at a heat exchanger 117 in one or more heating/pressurization and/or cooling steps to derive the desired pressure for the primary fluid 40. Energy within this process thus can be conserved, with a heat transfer process, by preheating a pressure tank wherein additional heat is required for the thermal compression. The solar receiver tank 31 includes at least one transparent opening or aperture 44 and is typically limited to low pressurization. The opening 44 can be sealed for at least low-pressures. The solar collector 30 can be an overhead collector, which spans an entire area over the transparent aperture 44 of the solar receiver tank 31. Furthermore, the collector 30 can be supported by a structure 42. Cell fluids such as Glycerol with a refractive index of 1.48 or liquid bromine with a refractive index of 1.67, can be supplied to at least some of a plurality of cells 41 that are in position to capture solar radiation.

In this manner a stationary collector with means for internal positioning of the refractive fluids can follow the sun more precisely than present art mechanized solar tracking devices. Furthermore, the overhead collectors 30 can be stacked in a series. By stacking the overhead collectors 30, the pressure tanks 38, and under ground receivers (not shown), land space is more efficiently used allowing for higher density solar fields. A solar-powered system, such as the system 210 is illustrated in FIG. 2 indicates the potential of generating massive amounts of power at least substantially without emitting any global warming gases. Such amounts of power can especially be produced in areas exposed to long and clear sunlight durations, such as Southwestern United States and similar regions. For example, electrical vehicles plugged into this source of power will operate substantially or completely pollution free as compared to other sources of electrical energy.

Figure 3:
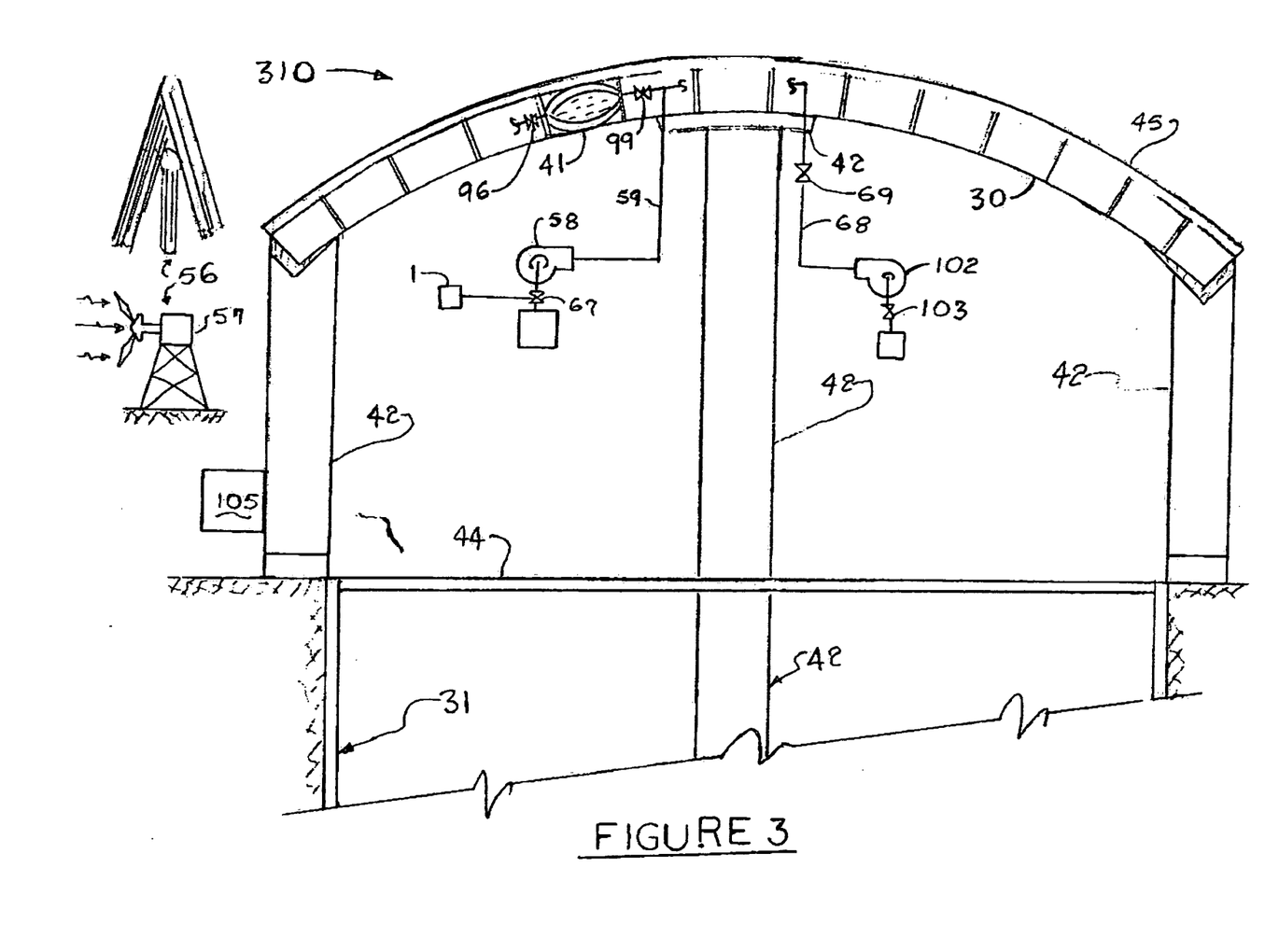
FIG. 3 is a schematic diagram of a portion of a power-generating system according to yet another embodiment.

FIG. 3 illustrates another embodiment of a solar-powered system 310. Referring to FIG. 3, the solar-powered system 310 comprises a solar refractive fluid transfer system 58 with controls and reservoir 67, a cell concentrator lens 141, at least one computer 1, automatic controls and conduits system 59, zone valve 99 and balancing valve 96 for fluid transfer to move the concentrator lens 141. A thermal liquid system having controls and a reservoir 103 and a pump 102 can also be provided for routing thermal fluids to and from the cell concentrator lens 141 via conduits 68 to zones through zone valve 69.

A top space 45 of the collector 30, above the fluid chambers can be evacuated to serve as an insulator. Structural hoops or frames can be implemented for better maintaining the evacuated cavity 45 under atmospheric pressure. The collector 30 is supported by a structure 42 having frames to permit maximum light transmission and temperature changes.

In the illustrated embodiments of FIGS. 2 and 3, the pressure tank or tanks 38 (See FIG. 2) can be located below the solar receiver tank 31 that contains the high-pressure working fluids. A resulting effluent is the primary fluid 40 that is used for power generation, while excess effluent can be stored in a system of auxiliary storage tanks. Further, in some embodiments, the structure 42 can be configured to absorb wind gusts and earthquake forces. For example, in one embodiment, as illustrated in FIG. 3, a wind-breaker 56, comprising at least one, or more than one, wind machines 57 and suitable tree-type structures can be used for protecting components of the solar-powered system 310, such as the roof assembly from wind gusts and storm damage. Such protecting structure can be designed such that the lens 141 continues to be at least substantially exposed to solar rays.

Figure 4:
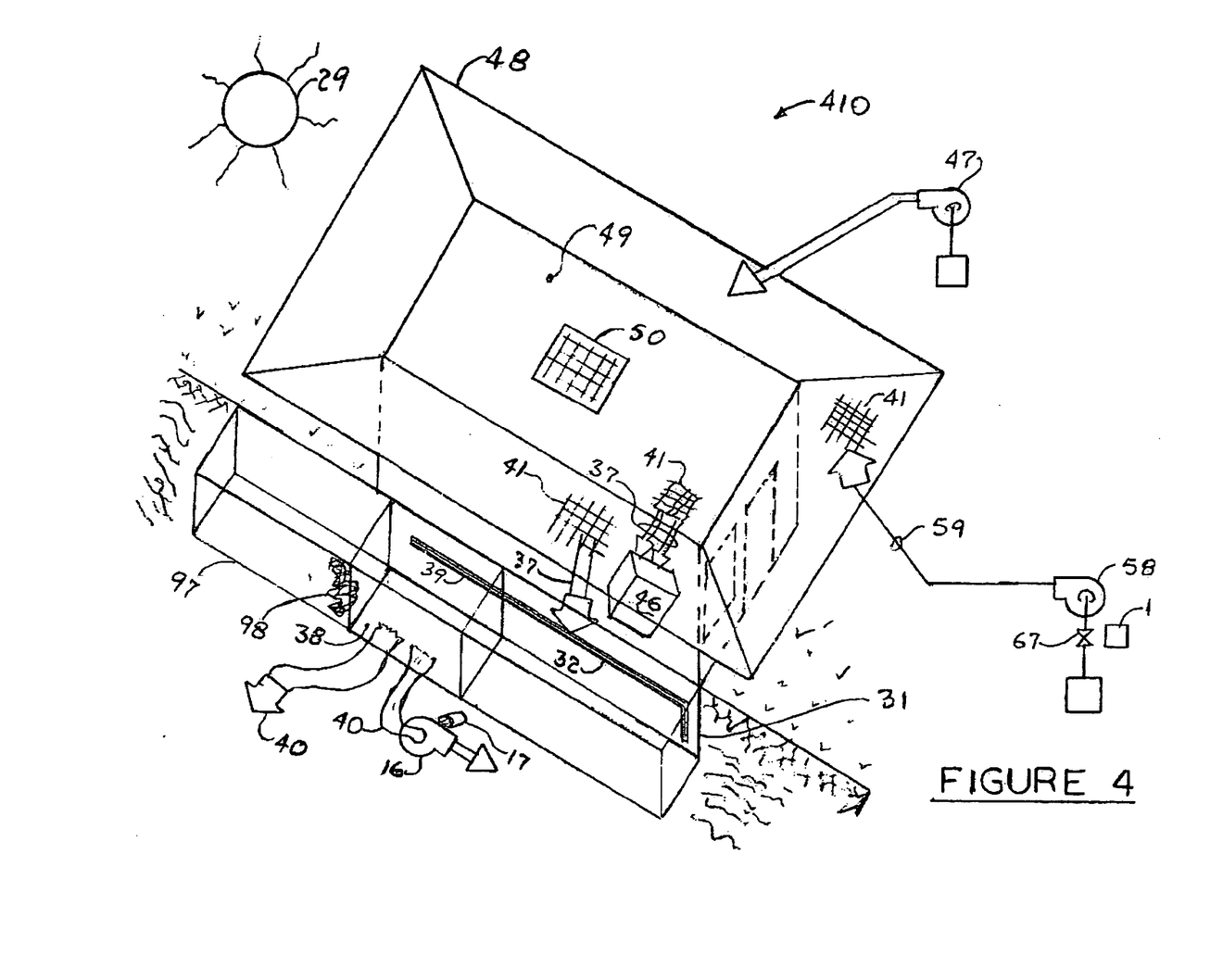
FIG. 4 is an isometric view of a power-generating system according to still another embodiment.
Figures 5A, 5B, 5C:
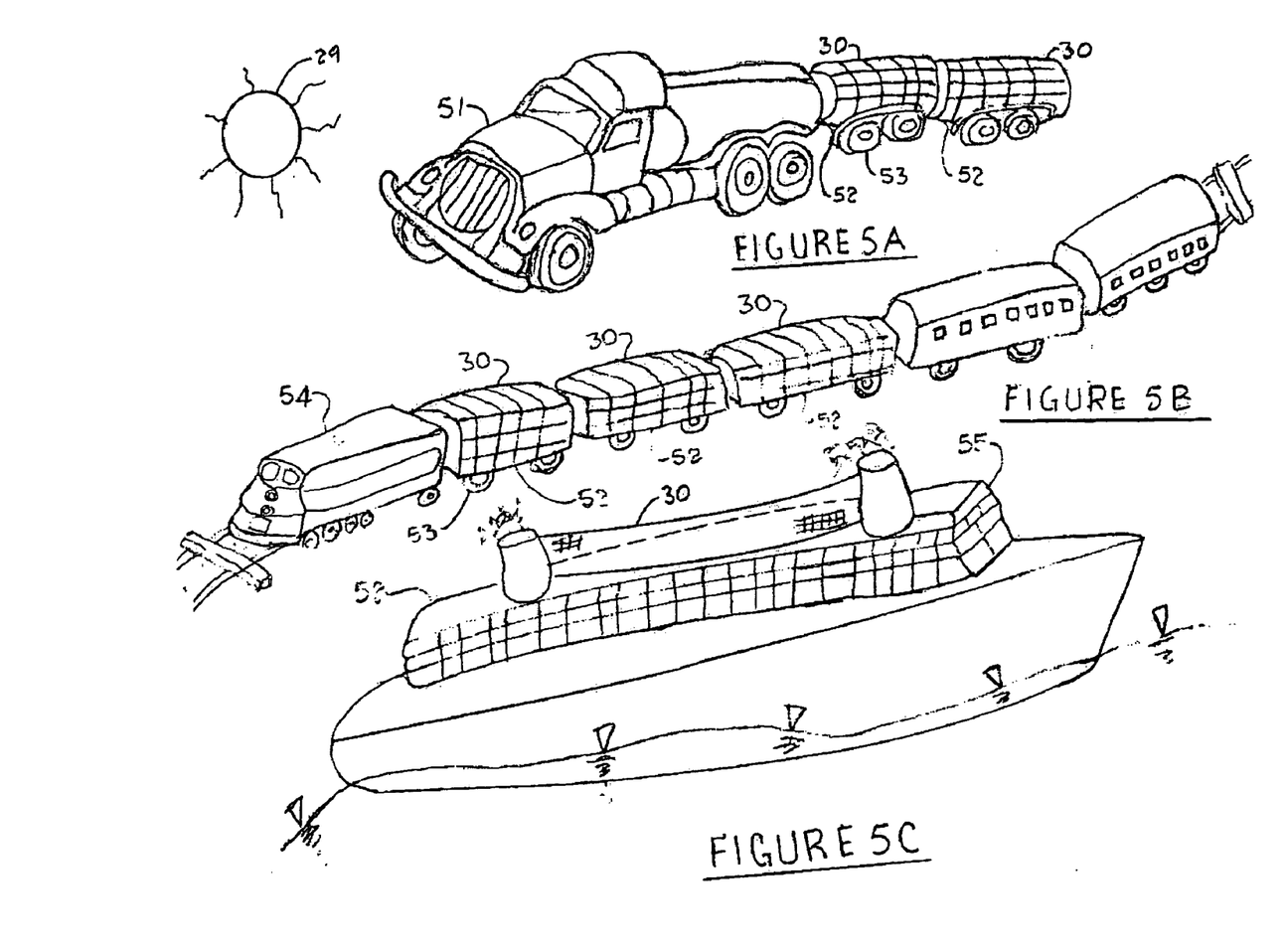
FIGS. 5A-5C are isometric views of a power-generating system according to another embodiment.
Figure 6:
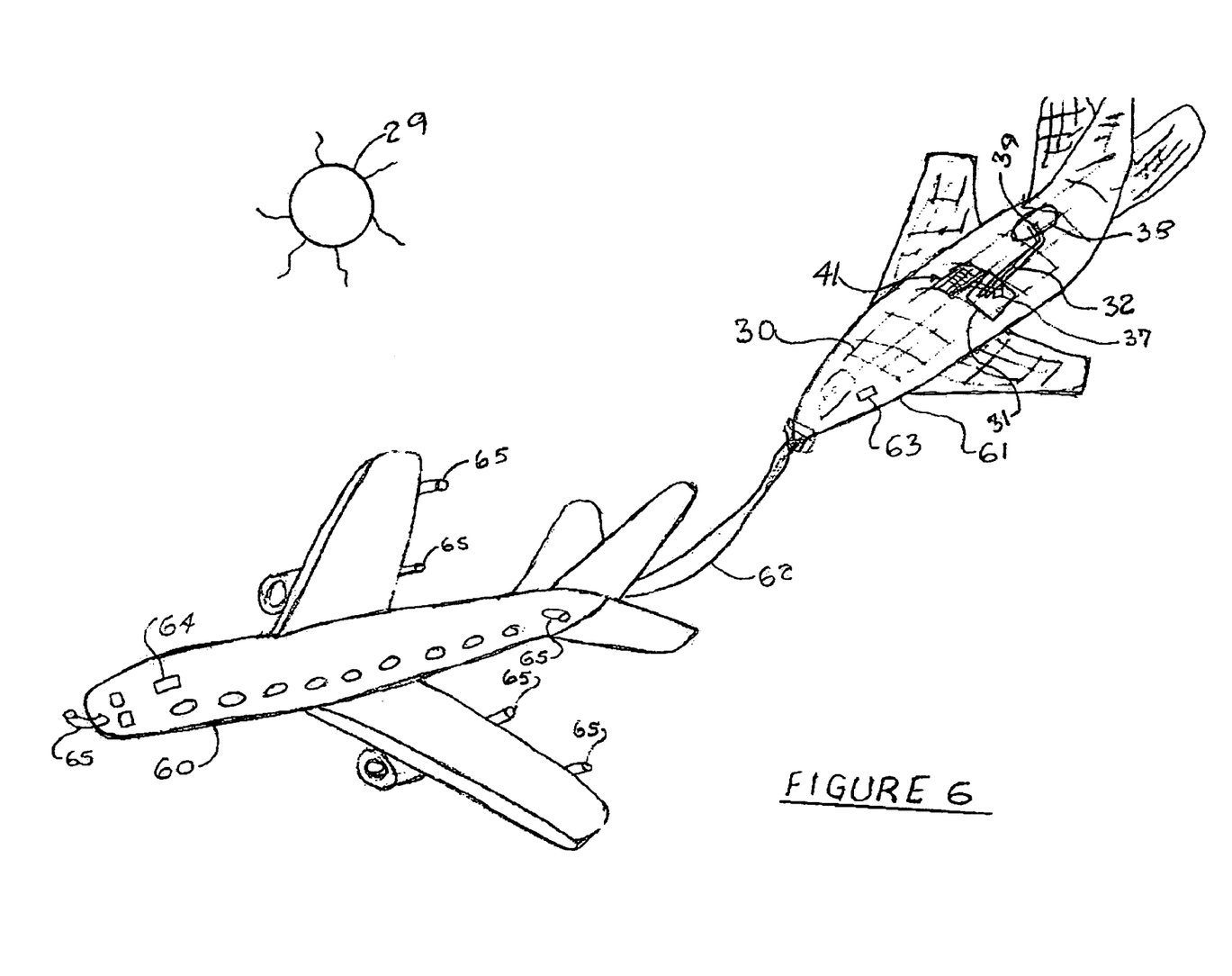
FIG. 6 is an isometric view of a power-generating system according to yet another embodiment.

To place example embodiments of the present disclosure in context, the following examples of certain applications in a residential, transportation, and industrial settings are provided in conjunction with FIGS. 4, 5, and 6. These examples are provided for a thorough understanding of the present disclosure; however, one of ordinary skill in the will appreciate that applications which can benefit from the present disclosure are countless. Accordingly, the following examples are not intended to limit the application of a power-generating system according to embodiments of the present invention.

Example I

As one example of an application of a power-generating system according to one embodiment, FIG. 4 illustrates a stand alone, off the grid, solar house 410. Typically the sun 29 can provide at least 100 watts of solar power per square foot. If under-ground water is available, substantially no utility service will be required. Otherwise the only utility service added for the solar house 410 may be for water. During initial stages of such a system, a standby thermal power system using a suitable fossil fuel can be used as a backup system. Experience and additional storage of energy may lead to a solar house without any backup fuel system.

The solar house 410 can be any building, such as a personal residence, an office, a clinic or a building for commercial use. As illustrated in FIG. 4, the solar house 410 includes a roof section 48 having an extended overhang so as to shade some or all fenestration or openings, which can be positioned at a suitable angle such that the roof section 48 is normal to the solar rays. A portion 49 of the roof section 48 is a shelter for the house. A transparent roof section 48 can provide an out door feeling without artificial lighting during the day. At least a portion of the roof section 48, such as a perimeter thereof, may include a complex of cells 41 of some geometrical shape most suitable for the structure and light transmission. The portion 49 of the roof section 48 covering the occupied area can be filled with a fluid to enhance comfort in summer or winter by changing the roof to a warm radiant panel during a heating season, and by cooling and serving as a solar reflective panel during the cooling season.

At least a portion of a surface of the roof 48 can be used to install photovoltaic cells 50 configured to convert light to electrical energy as is known in the field. The photovoltaic cells 50 can be cooled by fluid from the heat exchanger 21 illustrated in FIG. 1. The photovoltaic cells 50 include an electrical output that is suitable for small electrical loads.

Furthermore, a portion of the roof carrying the cells 41 can be dedicated to provide concentrated solar energy to impinge on a heat exchanger or a trombe wall 46 to store thermal energy during daylight to heat the building at night. A trombe wall can include a sun-facing wall fabricated from any material that can act as a thermal mass, in liquid or solid state, such as stone, concrete, adobe, water, any combination thereof, or any other suitable material. The roof section 48 picks up solar heat during daylight and stores it for heating, as a radiant panel, at night. When cooling is desired, a reflective cell fluid can be routed to the thermal fluid cells 41 to minimize solar radiation heat gain into the building, the thermal cells 41 acting as a cold fluid panel to reduce an air-conditioning load.

In one embodiment, the perimeter of the roof 48 can be divided into sections having a plurality of cells 41 used for concentrating rays of the sun 29 into the solar receiver tank 31, which can be positioned below ground. As the sun 29 moves across the sky, the concentrated solar beam 37 follows a band of the heat exchanger 32 and heat transfer element 39 transfers heat into the pressure tank 38 to develop the primary fluid 40 that is transferred to a series of underground thermal storage tanks 97 having a material 98 inside the tank to increase the thermal mass. The power turbine 16 turns the electrical generator 17 as discussed in conjunction with the power-generating system 110 above, and the primary fluid 40 at the elevated temperature and pressure can be used for activities such as cooking, laundry, other appliances, any combination thereof, or any other suitable activity.

Primary gases derived from the solar system alone can be used as a conventional solar-thermal power system. For instance, electrical power can be produced by a conventional steam turbine spinning the shaft of an electrical generator.

The roof solar collector can pick up direct and/or diffused solar radiation. The roof section 48 can be equipped with an evaporating cooling and cleaning system 47 using water and/or suitable cleaning fluids and/or chemicals. The computer 1 can be operable to monitor the controls 67 and regulates functions of the refractive liquid 58 through conduits 59.

Example II

A power-generating system according to an embodiment of the present disclosure makes it feasible to capture, store and utilize solar energy in self-propelled vehicles. This feature is particularly useful in zones of high solar energy in areas with minimum cloud cover and shadows. There are numerous opportunities to take advantage of these features for operating aircraft, ships, railroad trains and truck trains.

In some embodiments, solar collectors mounted on a towable structure can be stationed on standby to pickup solar energy until it is ready to be hitched to the vehicle. An umbilical cord structurally suitable for towing can include conduits for delivering the primary fluid or working fluid along with controls and electrical power connections.

This new technology includes storing large volumes of high-pressure fluids, such as gases, developed by concentrated solar rays when parked and made ready for a long journey. The fluid pressure can be further increased by thermal compression followed by cooling first stage of pressurized fluid and then reheat to further raise the pressure of the fluid. The solar energy storage may continue while moving.

These solar units can be designed to provide at least enough power to operate the vehicle during a long stretch under steady speed conditions. Useful solar energy will off set the use of fossil fuels and reduce carbon dioxide emissions based on the amount of fuel saved. The cost basis for such an arrangement is based on the payback of the cost of the solar structure by corresponding fuel savings. The environmental benefits have a very high social priority that can be subject to receiving public support and Government credits.

As one example of such an application of a power-generating system according to one embodiment, FIGS. 5A-5C illustrates transportation means, which pick up energy from the sun 29. For example, the energy can be picked up by trucks 51, trains 54, ships 55 and/or other self-propelled vehicles that can carry or tow a solar collector 30 like a blanket wrapped around a car or a section of a vehicle structure 52 having a plurality of transportation wheels 53 that can recover or regenerate energy during the deceleration mode by converting vehicle momentum to compressed air that may be used in a power-generating system such as the system 110 discussed above.

Alternatively, the compressed air can be directly used as a working fluid. The solar energy captured, can substantially reduce fuel consumption, especially in areas of high insolation.

If desired, the transportation apparatus or vehicle 51, 54, 55 can provide power from fuels for acceleration to normal running speeds. The vehicle 51, 54, 55 can be set to maintain the operating speed with solar energy, which is stored and/or is incoming. Accordingly, such a vehicle will be in harmony with nature and can operate at least substantially without any environmental impact. For example, a train loaded with passengers can cross a desert without producing any global warming gases.

Example III

As another example of an application of a power-generating system according to one embodiment, FIG. 6 illustrates a solar powered aircraft 60. Extraterrestrial solar energy incident outside an atmosphere of earth is about 1,370 watts per square meter and varies about ±3% depending on a position of earth in an orbit of the sun. The solar energy incident upon a surface of earth is typically about 40% less than that at high altitudes, such as 30,000 feet above sea level. This implies that more solar energy is available at high altitudes that can provide for powering airborne vehicles such as the solar powered aircrafts 60. Further, cloud cover is minimal at high altitudes and typically there are no shadows. While the shadow of the earth shields the solar rays at night, polar flights can reduce the nighttime shadow. Accordingly, large number of inter-continental flights can be routed over polar areas.

There is an inexhaustible source of solar energy available at these lofty altitudes. Aircraft, perhaps from a fleet of retired aircraft, can be designed retrofitted to robot control and pick up more solar energy than required for auto-operation. More so, a chain of solar collector gliders towed by a lead powered aircraft can increase the amount of energy collected. Excess energy is stored as a primary fluid. A patrolling fleet can periodically deliver the stored energy to a ground based solar power plant with means to continuously generate power that is fed into the electrical grid. Since this power is based entirely on solar energy, there will be zero Global Warming gases emitted. By replicating this process on a large scale, many energy problems can be solved. Application of such and other solar systems is only limited by availability of capital and political will. This system is particularly beneficial in the poverty areas of the world. When this system is globally deployed, it will go a long way to solve the earth's Global Warming problem.

The solar collectors 30 installed on the solar powered aircraft 60 may add weight, however, the provision of such collectors 30 can also alleviate a need for other power sources that add weight to the extent they are presently used. Examples of such sources include electrical sources such as batteries and generators, and fuel. Photovoltaic cells and other solar collection means can be installed directly on the aircraft.

In one embodiment, a glider 61 that is dedicated as a solar collector that can be configured to be towed behind aircraft 60 with an umbilical cord 62 attached to the aircraft 60 for providing or replenishing power to the aircraft 60. The high-pressure primary fluid 40 (FIGS. 1-3) is ducted to the aircraft 60, which is fitted with at least one, or a plurality of, propulsion nozzles 65 that are configured to provide power to maintain normal flying speeds, for example at an altitude of 30,000 feet, without the use of jet fuel. The solar powered gliders 61 can stay aloft, as a taxi service, and connect onto passing aircrafts 60. The gliders 61 can be capable of operating as an independent aircraft that could be remote controlled and be suitable to land and take off for service or refueling as required. Aircraft operable with power derived from the primary fluid can be fitted with nozzles to set up force vectors for complete propulsion, stability and maneuvering without the use of jet engines. Static and dynamic lift can also be enhanced by passing working fluid over the wing section while avoiding wing tip turbulence.

For practical implementation and maintenance of such a service, a system of tolls and fees can be put in place for airline operators to pay for such a service with costs that favor implementing such a system. Such a system is likely especially desirable for long flights by larger aircraft. With an effective solar power system there is a potential of transferring some of the land freight transport to air delivery systems including military uses. Accordingly, aircraft will be able to carry less fuel and a larger payload. This will have significant environmental benefits and reduce emissions of greenhouse gases that contribute to global warming.

The solar/fuel power glider 61 is wrapped in a solar collector 30 with cells 41, the collector 30 being configured to transfer refractive fluid to the cells 41 facing the sun. The concentrated solar beams 37 impinge on heat exchanger bands 32 in the solar receiver tank 31 and transfer a high temperate liquid to the heat transfer element 39 in the pressure tank 38. A potential energy of the primary fluid 40 is used for propulsion of the glider 61 and for delivery to the receiving aircraft 60 for stability and/or maneuvering. A first remote control 63 in the glider 61 can be configured to communicate with ground control and/or with a remote controller 64 in powered aircraft 60. When needed, the umbilical cord 62 can be coupled to the receiving aircraft 60 that is equipped with the propulsion or force vector nozzles 65.

When the aircraft 60 is operating with power from the primary fluid 40 derived from solar power, additional nozzles 65 can be installed on the aircraft 60 to further enable maneuvering and stability by force vectors. Accordingly, aircraft control panels, such as rudders, elevators, ailerons, flaps and spoilers can remain in a null position, which also reduces wind resistance and thus power requirements for overcoming such resistance. When enough primary gases 40 are stored, the aircraft 60 can hover or land by slowly dropping vertically by passing enough gases over wing sections to develop a static lift. For instance a large airplane could land on an aircraft carrier.

One of ordinary skill n the art will appreciate feasibility of such an embodiment for restoration of older commercial or military and supersonic aircraft, which can operate substantially without affecting the stratosphere, for example either as the receiving aircraft 60 or glider 61. In yet other embodiments, an aircraft or glider 60, 61 can be used to pickup solar energy at high altitudes and deliver the primary fluid 40 to a ground-based electrical power generating or any other power output system.

Example IV

Figure 7:
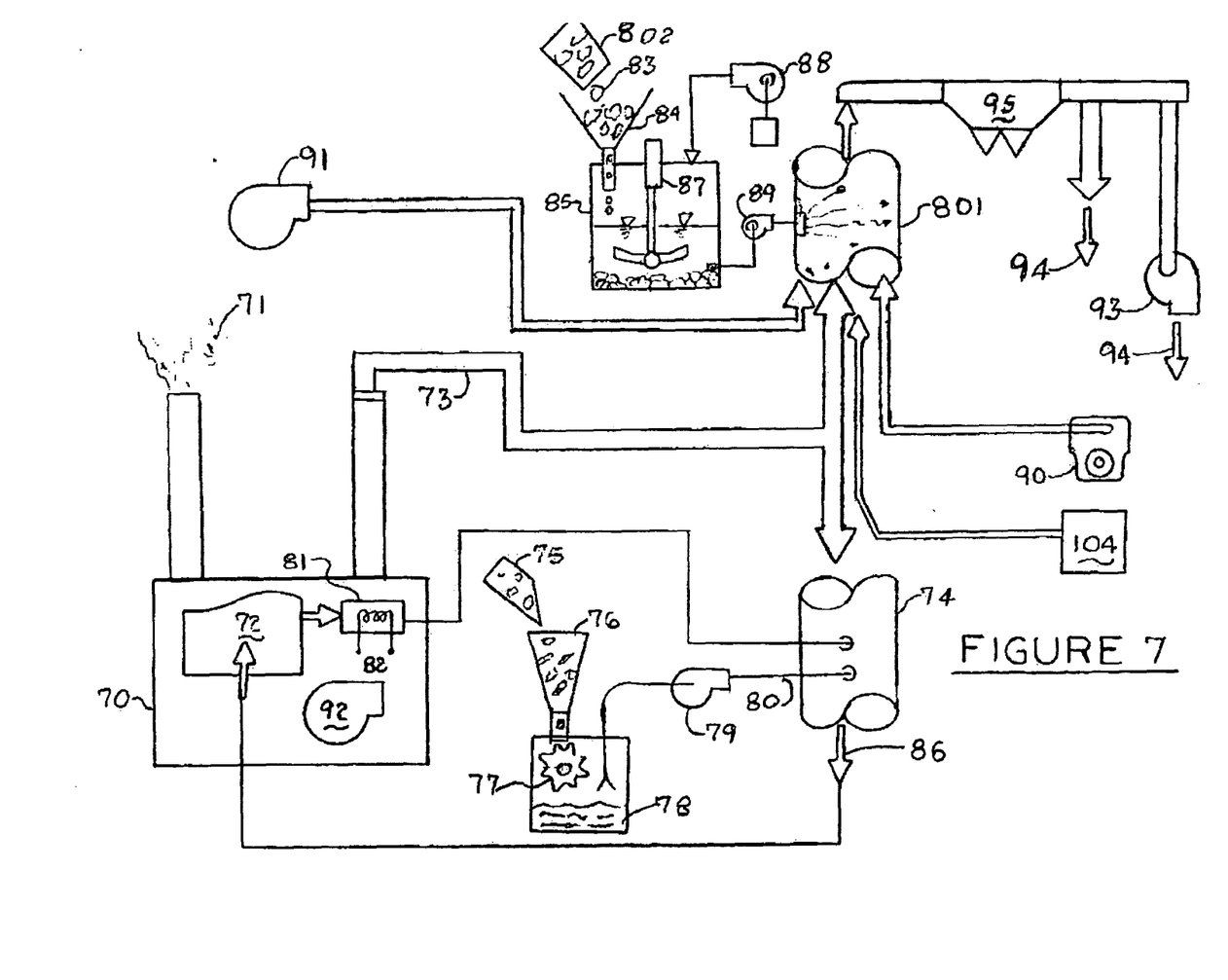
FIG. 7 is a schematic diagram of a power-generating system according to yet another embodiment.

As discussed above emitted exhaust fluid can be processed through a processing system for reacting the exhaust with a chemical reagent to reduce emissions of greenhouse gases. FIG. 7 illustrates another embodiment, in which a system 710 is provided for reducing emissions of carbon dioxide and other greenhouse gases that contribute to global warming by processing the exhaust gases. These exhaust gases can be produced at different stages of a power-generating system according to embodiments discussed herein, such as from the reactors or the combusting devices. For clarity of description and illustration, an operation of reduction of greenhouse gases will be described with reference to an example in a context where the greenhouse gas producing system or portion is referred to as a exhaust-producing device 70.

The exhaust-producing device 70 produces flue gases 71, which may contain large amounts of fly ash, "acid rain", carbon dioxide and sulfur dioxide, which in turn are spewed into the atmosphere. According to one embodiment, a complete stream 73 of flue gases 71 from a boiler 72, such as a coal fired boiler, is divided into a first stream and a second stream. The first stream, for example 35% of the complete stream 73, can be directed to a carbon dioxide conversion chamber 74 where the first stream is treated with pulverized coal and superheated steam, in the presence of air.

In one embodiment, coal from a drum discharge 75 can be deposited into a vibrating hopper 76 and then fed to a hammer mill 77 where the coal is pulverized to a fine powder and stored in a chamber 78 that is pneumatically conveyed in a system 79 through dispersal nozzles in a line 80.

In one embodiment, the superheated steam is provided by feeding a steam super heater 81, a steady steam supply from the boiler 72 while an external heater 82 applies additional heat to raise a temperature of the steam above a saturation point and raise the temperature to make the coal dust incandescent, for example a temperature of about 1,200 degrees Fahrenheit.

Injecting pulverized coal and superheated steam into the first stream treats the diverted flue gases from boiler 72. The carbon dioxide is reduced to carbon monoxide and the steam dissociates into hydrogen. The carbon dioxide is reduced to carbon monoxide in presence of the incandescent coal dust. The result is that the carbon dioxide is converted to produce a gas with a heating value of about 180 BTU per cubic foot containing carbon monoxide and Hydrogen.

Some of the coal dust distills breaking into volatile organic components, such as methane, ethane oils and tars that add some heating value to the fuel. This low-grade fuel 86 can be recycled to the boiler 72, thereby reducing carbon dioxide and sulfur dioxide emissions. Accordingly, the following reactions occur:

Carbon dioxide is produced:

$C+O_2 \sim CO_2$

Carbon dioxide is reduced:

$CO_2+C \sim 2CO$

Water vapor in steam-saturated air reacts with hot carbon:

$H_2O+C \sim CO+H_2$

The second stream of the complete stream 73, for example 65% thereof, can be routed to a reaction chamber 801. Additional carbon dioxide and sulfur dioxide are removed from the second stream of flue gases by injection of a strong alkaline reagent in the reaction chamber 801. The reagent is stored in the drum 802 that automatically drops chemical pellets 83 to vibrating hopper 84 whereby the pellets 83 enter mixing tank 85 that is filled with water from a water supply system 88 and includes a mixer 87. The mixer 87 automatically maintains solids in solution while pump 89 feeds the reaction chamber 801 with atomized solution. Combustion gases, for example from a gas turbine 91, an internal combustion engine 90, and/or a combustion source 104, are fed to the reaction chamber 801. In the reaction chamber 801, a portion of the carbon dioxide is converted to a solid reactant resulting in a drop in a pressure in the reaction chamber 801. The pressure drop enhances performance of the combustion process and reduces the energy demand on the boiler 72, forced draft fan 92, and an induced draft fan 93. In this manner performance of the internal combustion engine 90 can be improved. Particulate produced in the reaction chamber 801 is removed in a particulate separator 95 or other efficient solids separator. Accordingly, exhaust gases 94 contain less carbon dioxide upon emission to the atmosphere, and thereby retard an acceleration of global warming, especially once a system according to embodiments discussed herein or other embodiments within the scope of the following claims is widely used in various applications.

Example V

At about 30,000 feet above sea level intensity of solar energy available is about 40% higher than on a surface of earth. Generally, there is substantially no cloud cover and the only shadow is the shadow of the earth. The shadows are typically less at polar areas. The concentration of solar energy per unit area depends on the intensity of the sun's rays and the angle of incidence. Favorable sites for power plants can include top of the high mountains located near the equator. Mount Everest, for example, is 30,000 feet above sea level. Technology is available to build facilities at these difficult areas with economic and environmental advantages.

Figure 8:
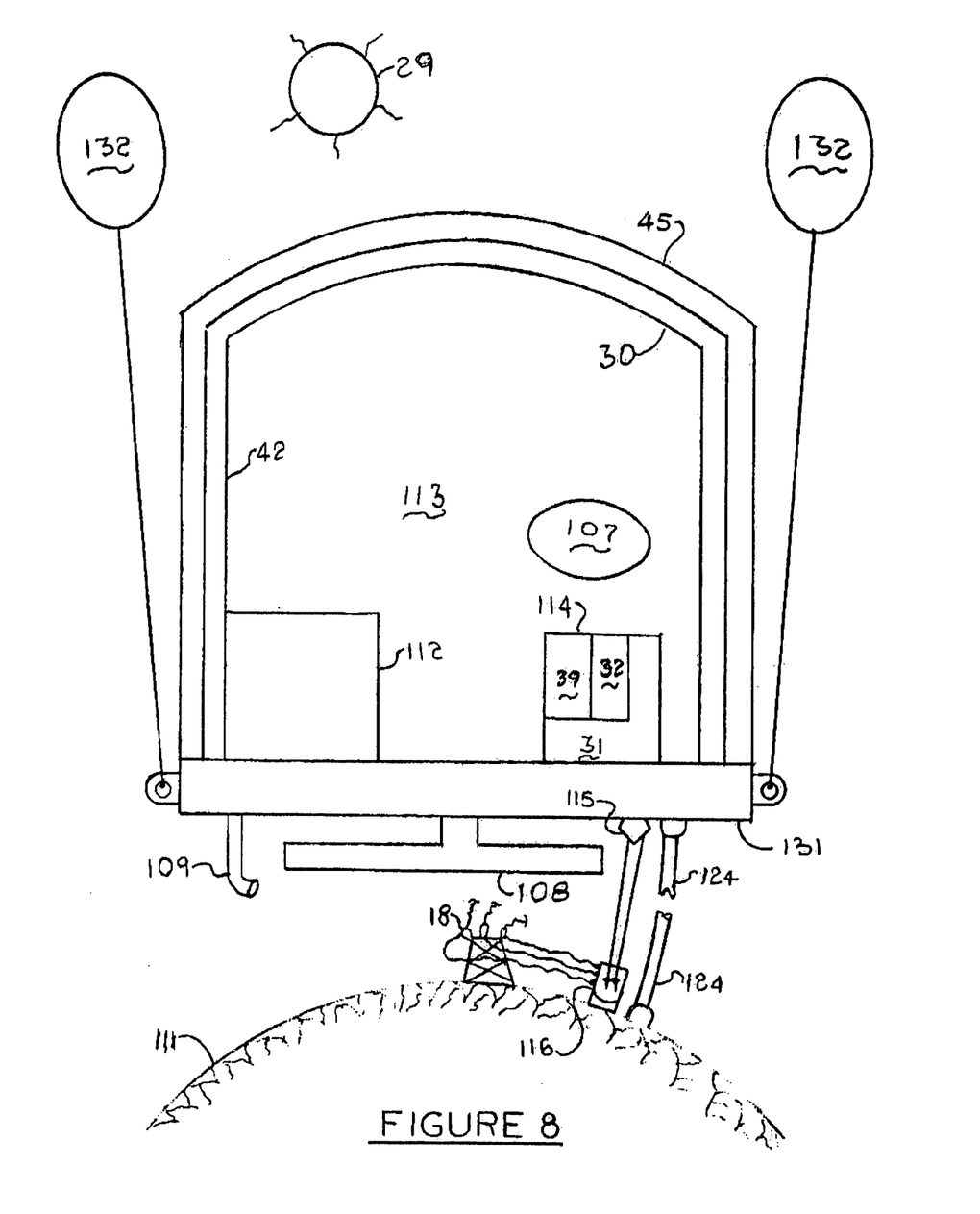
FIG. 8 is a schematic diagram of a power-generating system according to still another embodiment.

In one embodiment as illustrated in FIG. 8, a power station 113 can be positioned at a high altitude, such as at about 30,000 feet and can include a staging platform 131 that acts as a main frame and support of the power station 113. The platform 131 is supported by at least one, or more than one, levitating structures 132. The levitating structures 132 may comprise balloons filled with a gas that is lighter than air, such as Helium with hot air lift backup. For example, the balloons may be helium filled as a blimp with facilities for standby hot air balloons to allow time for repairs of base balloon system. The platform 131 can also be attached to an airfoil 108 and at least one nozzle 109 that can be used for lift and maneuvering by passing working fluid over the airfoil. A solar collector 30 is supported on a structure 42, which can be provided with weather protection covers that close during damaging weather. The process equipment 114 includes at least one, or more than one, receivers 31, a heat exchanger 32 and a heat transfer element 39 with all associated equipment for a complete and operable system similar to the solar-powered systems 210, 310, discussed above. An insulating vacuum chamber 45 all around surrounds the solar collector 30. A certain area 112 can be made habitable for maintenance persons. At least one primary fluid storage tank can be stored on board with means to safely deliver the tanks 107 as primary fluid stored energy. In areas where it is feasible, an umbilical cord 124 can be directly piped to a land-based receiving station on a surface 111 of earth.

In some embodiments, power can be transferred to land with electrical to optical, intense energy, microwave or particle beam conversion high energy beam emitter 115 and received at station 116 with means to generate electrical power suitable to be connected to the grid 18. In the process of developing high energy beams, waste produced can be incorporated into the power generating system 110.

From the foregoing, one of ordinary skill in the art will appreciate that, compared to present art and existing power generation systems, embodiments of the present disclosure can be suitable for hybridization with solar and wind energy, or both. A variety of fuels can be used. The embodiments provide a system that is "green" and very efficient and flexible.

In contrast, present art solar systems are capital intensive and require large areas of land. Furthermore, present art collectors are open to the atmosphere with significant heat losses and capture a smaller portion of the solar spectrum. Moreover, Photovoltaic systems convert about 14% of incident solar energy to electricity. Additionally, thermal collectors only produce hot water, and concentrated collectors produce steam to turn turbines. However, the present art collectors do not collect diffused sky radiation.

The collectors of embodiments discussed herein and other embodiments within the scope of the claims of the present disclosure, are adapted to collect the entire solar spectrum in one composite collector and track the sun as a static collector. Further, low level heat in the process can be used in embodiments of the power-generating system. From a financial perspective, one of ordinary skill in the art will appreciate that these efficiencies will yield a return on investment, which is significantly higher.

With more efficient and quiet power-generating systems installed for lower capital costs, distributed power generation systems will provide immense economic advantages and alleviate loading of local, regional and national electrical grids and also mitigate the impact of rolling blackouts or brown outs. A utility organization can refund at current rates to a client for electrical energy generated at the local site and returned to the power grid. High-rise buildings, for instance, can generate power continuously with revenue, particularly during off-hours.

Incentives can be afforded for such activity to amortize the investment and operating costs. The cost of locally generated electrical power is much lower. Power generated by utilities is not efficient at a point of use due to additional energy losses for voltage transformation at the generating side, long distance transmission line grids, voltage transformation at a supply end and distribution losses at the supply end. The net efficiency of electrical power from the grid is about 30% compared to about 80% for onsite power. In addition, this significant gain in efficiency for utilization of said electrical power substantially reduces atmospheric pollutants and greenhouse gases issued into the atmosphere, for preventing or substantially slowing global warming.

The high pressure gas internet as discussed herein may comprise primary gases which when distributed from a central source provide enhanced thermal efficiency and economic efficiency for appliances such as space heating, hot water heating, gas cooking and clothes drying. Utility Electrical energy is about 35% efficient at the point of use.

Furthermore, the following table summarizes some of the advantages of a solar-powered system according to one embodiment, such as the systems 210, 310 discussed above, as compared to typical present art solar systems.

TABLE 1

Advantages of a solar-powered system according to one embodiment as compared to typical present art solar systems.

| ITEM | SOLAR-POWERED SYSTEM ACCORDING TO ONE EMBODIMENT | PRESENT ART SOLAR SYSTEM |
| --- | --- | --- |
| Percent useful energy - % | 70 to 80 | 10 to 40 |
| Usable insolation - Plant unavailability | Direct and diffused (potential for continuous operation) | Direct and diffused in some cases (periods of down time) |
| Sun-angle affects - shading and blocking | Collector is large enough to pickup most of the insolation | Collector looses some energy due to adjacent objects |
| Optical losses - Mirror soiling, reflectivity, collector tracking and receiver spillage | Insolation is absorbed by the collector field that could be underground and insulated - system includes automatic cleaning and antifreeze to prevent ice build up | Losses occur in mirrors and lenses and open air receivers- automatic cleaning is not cost effective |
| Receiver reflectance losses | Large solar collectors over the receiver captures most reflected components | Reflectance losses occur |
| Thermal energy losses | Collector is insulated and totally enclosed as a part of an adiabatic process | Collector looses by radiation heat to the atmosphere |
| Heat transport systems | All conduits are insulated and likely underground as a part of an adiabatic process | Overhead pipes, tanks etc have heat losses |
| Turbine cycle heat rejection | Adiabatic process minimizes parasitic heat losses. Low temperature exhausts of expanded working fluid looses little energy | Significant parasitic and exhaust gas losses occurs in the conversion of thermal energy to electricity |

TABLE 1-continued

Advantages of a solar-powered system according to one embodiment as compared to typical present art solar systems.

| ITEM | SOLAR-POWERED SYSTEM ACCORDING TO ONE EMBODIMENT | PRESENT ART SOLAR SYSTEM |
| --- | --- | --- |
| Thermal and electric parasites | Electricity is generated only for lighting, controls and communications. Working fluid Power turbines are used for all heavy loads | Large electric drives require high starting currents and expensive motor control centers, switchgear and wiring. Losses occur due to wire heating, magnetic losses and motor cooling losses |
| Site of solar plant | Suitable for urban and remote locations | Megawatts Power plants must be remotely sited |
| Cost favorable | Most cost favorable | Extensive payback periods - not cost favorable |
| Photovoltaic cell systems | Can be integrated into a massive solar collector for direct electrical output for electronic controls, computers and lighting. Cooling of modules is natural because large volumes of expanded (cooled) working fluid can used Larger portion of the visible short-wave part of the electromagnetic spectrum can be utilized | Reduced power output due to rise in temperature. Operating voltage and power is reduced by about 0.5% for every 1° C. temperature rise |
| Area of land required | Equipment is stacked for example underground, and requires less area for the same output | Location of reflectors and receivers is controlled by focal length of optical equipment and all equipment are typically above ground, requiring large areas for comparable output |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A solar power-generating system comprising:
   means for forming a primary fluid at a first range of elevated temperature and pressure;
   means for forming a secondary fluid at a second range of temperature and pressure, less than the first range, at least one of the means for forming the primary and secondary fluids including a solar-powered system configured to form the corresponding fluid;
   a substantially thermally insulated mixing and expansion device in fluid communication with the means for forming the primary and secondary fluids, the thermally insulated mixing and expansion device being configured to expand at least one of the primary and secondary fluids and form a working fluid therefrom wherein the means for forming the primary fluid comprises:
   a plurality of reactors having a common first housing; and
   a combusting device having a second housing, wherein
      the system further comprises means for supplying a cooling fluid to the first and second housings, the cooling fluid having a fourth range of temperature and pressure less than the second range of temperature and pressure, the cooling fluid being in thermal communication with the reactors and combustor as it travels through the housing for extracting heat produced thereby and raising the temperature and pressure of the cooling fluid to the second range for forming the secondary fluid for delivery to the mixing and expansion device, whereby heat losses from the solar power-generating system are minimized for operating at least substantially adiabatically.

2. The solar power-generating system of claim 1, wherein the solar-powered system includes:
   a solar ray collector having a plurality of cells configured to follow a position of a solar source to concentrate solar rays into high-energy beams;
   a solar energy receiver tank; and
   heat exchange band having at least a first end in thermal communication with the cells for forming the secondary fluid or the primary fluid, the heat exchange band being in thermal communication with the solar energy receiver tank for forming, storing or delivering the secondary fluid or the primary fluid to the mixing and expansion device.

3. The solar power-generating system of claim 1, further comprising:
a refractive fluid routing system having a refractive fluid storage device and means for routing a refractive fluid to and from at least some of the plurality of cells;
a thermal fluid routing system having a thermal fluid storage device and means for routing the thermal fluid; and
a concentrator lens configured to further concentrate solar rays into high-energy beams.

4. The solar power-generating system of claim 1, further comprising:
a support structure having an arcuate platform and a weather protection cover configured to support the solar ray collector and allow a movement of the solar ray collector along the arcuate platform.

5. The solar power-generating system of claim 4 wherein the structure includes a building or a transportation apparatus having operating devices for powering the building or the transportation apparatus, the operating devices being in fluid communication with the at least one pressure tank for receiving the gaseous working fluid and producing work to operate the building or transportation apparatus, respectively.

6. The solar power-generating system of claim 5 wherein the transportation apparatus includes a vehicle having a plurality of wheels configured to convert vehicle momentum to compressed air to regenerate energy during a deceleration mode of the vehicle.

7. The solar power-generating system of claim 1, further comprising:
a transparent or translucent opening positioned between the solar ray collector and the heat exchange band, the concentrated solar rays passing through the opening toward the heat exchange band.

8. The solar power-generating system of claim 7 wherein the opening is sealed for at least low-pressures.

9. The solar power-generating system of claim 1, further comprising:
a motion assembly configured to move the solar ray collector;
a sensor in electronic communication with the motion assembly, the sensor being configured to monitor a movement of the solar source and communicate the movement of the solar source to the motion assembly for synchronizing the movement of the solar ray collector with the movement of the solar source.

10. The solar power-generating system of claim 1, further comprising:
an umbilical cord in fluid communication with at least one of the receiver tank and the pressure tank for delivering the gaseous working fluid for use with a transportation apparatus.

11. The solar power-generating system of claim 10, further comprising:
a lift mechanism for levitating at least a portion of the solar power-generating system at an altitude above sea level.

12. The solar power-generating system of claim 11 wherein the lift mechanism is operable to raise and lower the solar-powered system to a desired altitude.

13. The solar power-generating system of claim 11 wherein the lift mechanism comprises at least one of at least one gas-filled structure comprising a gas lighter than air, at least one pressure-producing nozzle, a hot air backup lift system, and at least one airfoil structure.

14. The solar power-generating system of claim 1, further comprising:
an evacuated transparent space positioned between the solar source and the solar ray collector, proximate the solar ray collector, for insulation.

15. The solar power-generating system of claim 1 wherein at least some of the cells are filled with a thermal material configured to form radiant heating and cooling panels.

16. The solar power-generating system of claim 1 wherein the solar ray collector is positioned on an aircraft for gathering solar energy at high altitudes and forming and delivering the primary fluid to a ground-based power generating system.

17. The solar power-generating system of claim 1 wherein the solar ray collector or the receiver tank are respectively positioned for maximum solar gain at an altitude of at least 100 feet above sea level and the system further includes means for transferring the gaseous working fluid to a land-based receiving station.

18. The solar power-generating system of claim 1 wherein at least some of the plurality of cells of the solar ray collector are provided on a roof of a building and are configured to transform between a reflective state to cool the building and a radiant state to heat the building.

19. The solar power-generating system of claim 1 wherein at least some of the cells are filled with a refractive material.

20. The solar power-generating system of claim 1 wherein at least one of the solar ray collector and receiver tank is respectively positioned at an altitude of approximately 30,000 feet above sea level.

21. The solar power-generating system of claim 1 wherein the thermally insulated mixing and expansion device is configured to mix the primary and secondary fluids to form an admixture of fluids as a working fluid having a third range of temperature and pressure, between the first and second ranges.

22. The solar power-generating system of claim 1 wherein the solar-powered system further comprises:
at least one pressure tank having a heat exchange element and being in thermal communication with the heat exchange band for forming and delivering at least one of the primary fluid and the secondary fluid to the mixing and expansion device.

23. The solar power-generating system of claim 1, further comprising a chemical reagent storage and delivery device positioned downstream from the plurality of reactors and combusting device and in fluid communication with an exhaust portion of the solar power-generating system to supply a chemical for reacting with exhaust fluids, including at least one greenhouse gas, formed by the processing of fluids in the plurality of reactors and combusting device, with the chemical for reducing emissions of greenhouse gases.

24. The solar power-generating system of claim 1, further comprising:
means for supplying the working fluid to a work-producing device by expansion of the working fluid.

25. The solar power-generating system of claim 24, wherein the means for supplying the working fluid comprises:
a storage device for storing and distributing the working fluid;
means for providing a modulated flow of the working fluid in fluid communication with the storage device;
a power turbine configured to receive the modulated flow; and
at least one electrical generator in fluid communication with the power turbine to receive the modulated flow and produce electrical power.

26. The solar power-generating system of claim 24 wherein the means for supplying the working fluid comprises:
- a double-acting free piston apparatus in fluid communication with the mixing and expansion device and configured to expand the working fluid or an effluent thereof to a sub-atmospheric pressure to form cooled air for use in a cooling application.

27. The solar power-generating system of claim 1, further comprising:
- a network of at least two storage devices in fluid communication with a network of distribution channels for storing and distributing the primary or secondary fluids, or a mixture thereof, as working fluid.

28. The solar power-generating system of claim 1 wherein the mixing and expansion device comprises a double acting free piston apparatus configured to concurrently receive the primary and secondary fluids toward opposing sides of the of a cylindrical housing of the double acting free piston apparatus for partial expansion of at least one of the primary and secondary fluids and mixing of the primary and the secondary fluids to produce the working fluid.

29. The solar power-generating system of claim 1, further comprising:
- a reaction chamber configured to receive at least a portion of exhaust fluids emitted from the power-generating system; and
- a mixing device configured to mix a liquid and an alkaline reagent to form an atomized solution, the mixing device being in fluid communication with the reaction chamber to supply the atomized solution thereto, the reaction chamber reacting the exhaust fluid and the atomized solution for reducing greenhouse gases including carbon dioxide.

30. The solar power-generating system of claim 1 wherein the solar-powered system includes at least one pressure tank having a high pressure chamber and a gaseous fluid therein,
- the receiver tank having a low pressure chamber,
- at least one pressure tank having a high pressure chamber and a gaseous fluid therein;
- a heat exchange arrangement having the heat exchange band positioned in the low pressure chamber and a heat exchange element at least partially positioned in the high pressure chamber and in fluid communication with the heat exchange band, means for passing a heat exchange fluid through the heat exchange band and the heat exchange element, thermal energy from the high-energy beams heating the heat exchange fluid, the heat exchange element raising the temperature and pressure of the gaseous fluid in the high pressure chamber to form the gaseous working fluid.

31. The solar power-generating system of claim 30 wherein the pressure tank is thermally insulated, the pressure tank being configured with a thermal mass in liquid or solid state to collect and store energy received from the heat exchange band.

32. The solar power-generating system of claim 1, further comprising:
- a cooling device configured to cool the working fluid when the fluid is routed proximate the cooling device.

33. The solar power-generating system of claim 32, further comprising:
- means for increasing a pressure of the gaseous working fluid in fluid communication with the cooling device.

34. The solar power-generating system of claim 1, further comprising:
- a solar-powered aircraft system including at least one aircraft configured to collect and store solar energy and adjust flying velocity to maximize exposure to available sunlight corresponding to a position of flight.

35. The solar power-generating system of claim 34 wherein the solar-powered aircraft system includes a mechanism configured to deliver the solar energy or working fluid formed from the solar energy to other aircrafts or to a receiving station on ground.

36. The solar power-generating system of claim 34 wherein the solar-powered aircraft includes a remote control receiver facilitating remote control of the solar-powered aircraft toward regions of available solar rays and away from adverse weather conditions inhibiting solar ray exposure.

37. The solar power-generating system of claim 34 wherein the solar-powered aircraft is positioned at a location relative to earth such that the solar-powered aircraft is exposed to solar rays at substantially all times.

38. The solar power-generating system of claim 34 wherein the solar-powered aircraft includes photovoltaic cells.

39. The solar power-generating system of claim 34 wherein the solar-powered aircraft operates using a portion of the primary fluid derived from solar power, and further includes devices configured to enable propulsion, maneuverability and stability by force vectors, allowing substantially all aerodynamic control panels to remain in a null position.

* * * * *